United States Patent
Hsieh

(10) Patent No.: US 8,520,073 B2
(45) Date of Patent: Aug. 27, 2013

(54) POWER SUPPLY CIRCUIT FOR INFRARED CUT REMOVABLE FILTER

(75) Inventor: Ming-Chih Hsieh, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 422 days.

(21) Appl. No.: 12/963,642

(22) Filed: Dec. 9, 2010

(65) Prior Publication Data

US 2012/0044356 A1 Feb. 23, 2012

(51) Int. Cl.
*H04N 5/33* (2006.01)

(52) U.S. Cl.
USPC ........................................ 348/164; 348/222.1

(58) Field of Classification Search
USPC .......... 348/164, 222, 500; 250/201.2; 358/44
See application file for complete search history.

(56) References Cited

U.S. PATENT DOCUMENTS

| | | | | |
|---|---|---|---|---|
| 4,437,111 A * | 3/1984 | Inai et al. | ................... | 348/222.1 |
| 5,033,508 A * | 7/1991 | Laverty, Jr. | ............. | 137/624.11 |
| 5,068,737 A * | 11/1991 | Taniguchi et al. | ........... | 348/353 |
| 5,070,407 A * | 12/1991 | Wheeler et al. | ............... | 348/342 |
| 5,227,834 A * | 7/1993 | Ishida et al. | ..................... | 396/96 |
| 5,371,567 A * | 12/1994 | Ishida et al. | ..................... | 396/89 |
| 5,469,239 A * | 11/1995 | Ishida et al. | ..................... | 396/96 |
| 6,437,824 B1 * | 8/2002 | Suzuki et al. | ............. | 348/222.1 |
| 6,628,355 B1 * | 9/2003 | Takahara | ...................... | 349/106 |
| 7,607,841 B2 * | 10/2009 | Wada et al. | .................... | 396/419 |
| 7,812,301 B2 * | 10/2010 | Oike et al. | ................... | 250/208.1 |
| 7,839,439 B2 * | 11/2010 | Sato et al. | ...................... | 348/241 |
| 7,916,205 B2 * | 3/2011 | Takahashi et al. | ............ | 348/345 |
| 8,031,241 B2 * | 10/2011 | Maeda et al. | ................. | 348/241 |
| 8,218,060 B2 * | 7/2012 | Kawai | ............................ | 348/340 |
| 8,222,709 B2 * | 7/2012 | Oike et al. | ..................... | 257/443 |
| 8,294,801 B2 * | 10/2012 | Ito et al. | ......................... | 348/311 |
| 2001/0028438 A1 * | 10/2001 | Matsumoto | .................... | 351/206 |
| 2003/0187319 A1 * | 10/2003 | Kaneko et al. | .................... | 600/9 |
| 2006/0006308 A1 * | 1/2006 | Konishi | ..................... | 250/201.2 |
| 2007/0147193 A1 * | 6/2007 | Wada et al. | ................. | 369/44.14 |
| 2008/0180555 A1 * | 7/2008 | Sato et al. | ..................... | 348/248 |
| 2009/0009635 A1 * | 1/2009 | Maeda et al. | ................. | 348/241 |
| 2011/0019025 A1 * | 1/2011 | Koseki | ........................ | 348/222.1 |
| 2011/0134293 A1 * | 6/2011 | Tanaka | .......................... | 348/280 |
| 2011/0141324 A1 * | 6/2011 | Koseki | ........................... | 348/241 |
| 2012/0044566 A1 * | 2/2012 | Hsieh | ............................. | 359/356 |
| 2012/0050515 A1 * | 3/2012 | Shikaumi et al. | .............. | 348/78 |
| 2012/0235021 A1 * | 9/2012 | Kasai | ......................... | 250/208.1 |
| 2012/0314085 A1 * | 12/2012 | Gohshi et al. | ................. | 348/164 |

* cited by examiner

*Primary Examiner* — Christopher S Kelley
*Assistant Examiner* — Deirdre Beasley
(74) *Attorney, Agent, or Firm* — Altis Law Group, Inc.

(57) ABSTRACT

A power supply circuit for an infrared cut removable (ICR) filter includes an identifying module, a supply mode module, a switching module, and a power source module. The identifying module generates a first identifying signal when the brightness of external light is higher than a preset brightness; otherwise, the identifying module generates a second identifying signal. The supply mode module generates a power supply corresponding to the power supply mode of the ICR filter. The switching module includes two connecting nodes for connecting to the ICR filter and loads the power supply generated by the supply mode module on one of the nodes correspondingly according to the first and second identifying signals. The power source module is connected to an external DC power supply and generates an operating voltage for the identifying module, the supply mode module, and the switching module.

17 Claims, 3 Drawing Sheets

POWER SUPPLY CIRCUIT FOR INFRARED CUT REMOVABLE FILTER

BACKGROUND

1. Technical Field

The present disclosure relates to power supply circuits and, particularly, to a power supply circuit for an infrared cut removable filter.

2. Description of Related Art

Surveillance cameras usually employ an infrared cut removable (ICR) filter that is arranged in front of a charge coupled device (CCD). The ICR includes an infrared filter and an optical interference filter. During the daytime, the infrared filter is switched in front of the CCD to filter out the infrared, so as to obtain undistorted images. At night, the optical interference filter is switched in front of the CCD instead of the infrared filter to eliminate the interference of the visible light, so that clear images can be obtained.

There are basically three power supply modes of different ICR filters: continuous power supply, pulse power supply, and instantaneous power supply. When a surveillance camera utilizes an ICR filter of different power supply modes from the former one (in repair, for example), the surveillance camera usually has to employ a corresponding kind of power supply circuit to power the ICR filter, which means that the hardware compatibility between the power supply circuit and the ICR filter is low.

Therefore, it is desirable to provide a new power supply circuit for an ICR filter, which can overcome the above-mentioned limitations.

BRIEF DESCRIPTION OF THE DRAWING

Many aspects of the present disclosure should be better understood with reference to the following drawing. The components in the drawing are not necessarily drawn to scale, the emphasis instead being placed upon clearly illustrating the principles of the present disclosure.

DETAILED DESCRIPTION

Embodiments of the present disclosure will now be described in detail with reference to the drawings.

Figure 1:
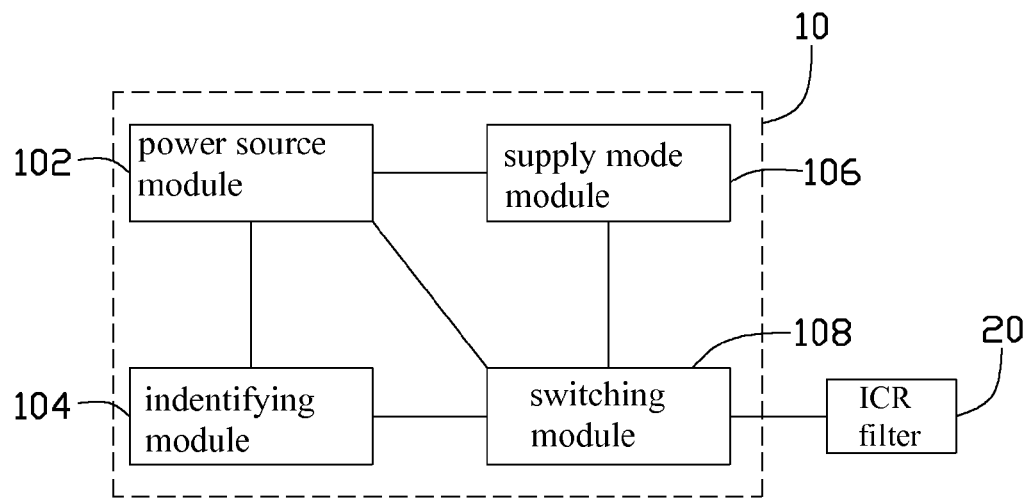
FIG. 1 is a schematic view of a power supply circuit for an infrared cut removable filter, in accordance with an exemplary embodiment.

Referring to the FIG. 1, a power supply circuit 10 for an infrared cut removable (ICR) filter 20, according to an exemplary embodiment, includes a power source module 102, an identifying module 104, a supply mode module 106, and a switching module 108.

Figure 2:
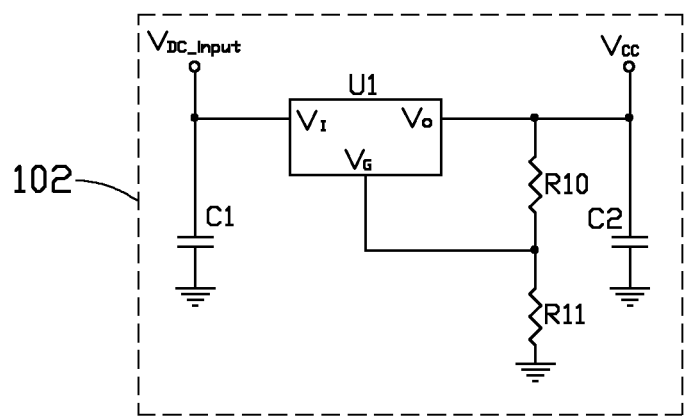
FIG. 2 is a circuit diagram of a power source module of the power supply circuit of FIG. 1.

Referring to the FIG. 2, the power source module 102 is connected to an external DC power supply $V_{DC-input}$ and generates an operating voltage $V_{CC}$ for the identifying module 104, the supply mode module 106, and the switching module 108. In detail, the power source module 102 includes a converting module U1, two resistors R10, R11, and two capacitors C1, C2. The converting module U1 includes an input port $V_I$ connected to the external DC power supply $V_{DC-input}$, an output port $V_O$, and a feed-back port $V_G$. The resistors R10 and R11 are connected in series between the output port $V_O$ and the ground. The feed-back port $V_G$ is connected to a node between the resistors R10 and R11. The capacitor C1 is connected between the input port $V_I$ and the ground. The capacitor C2 is connected between the output port $V_O$ and the ground. In the present embodiment, the converting module U1 is a low dropout regulator (LDO).

The converting module U1 converts the external DC power supply $V_{DC-input}$ and outputs the operating voltage $V_{CC}$ from the output port $V_O$. The feed-back port $V_G$ acquits a feedback voltage, so that the converting module U1 can adjust the output thereof. Therefore, the operating voltage $V_{CC}$ remains constant. The capacitor C1 and C2 is used to filter AC current that might run into or out of the converting module U1.

Figure 3:
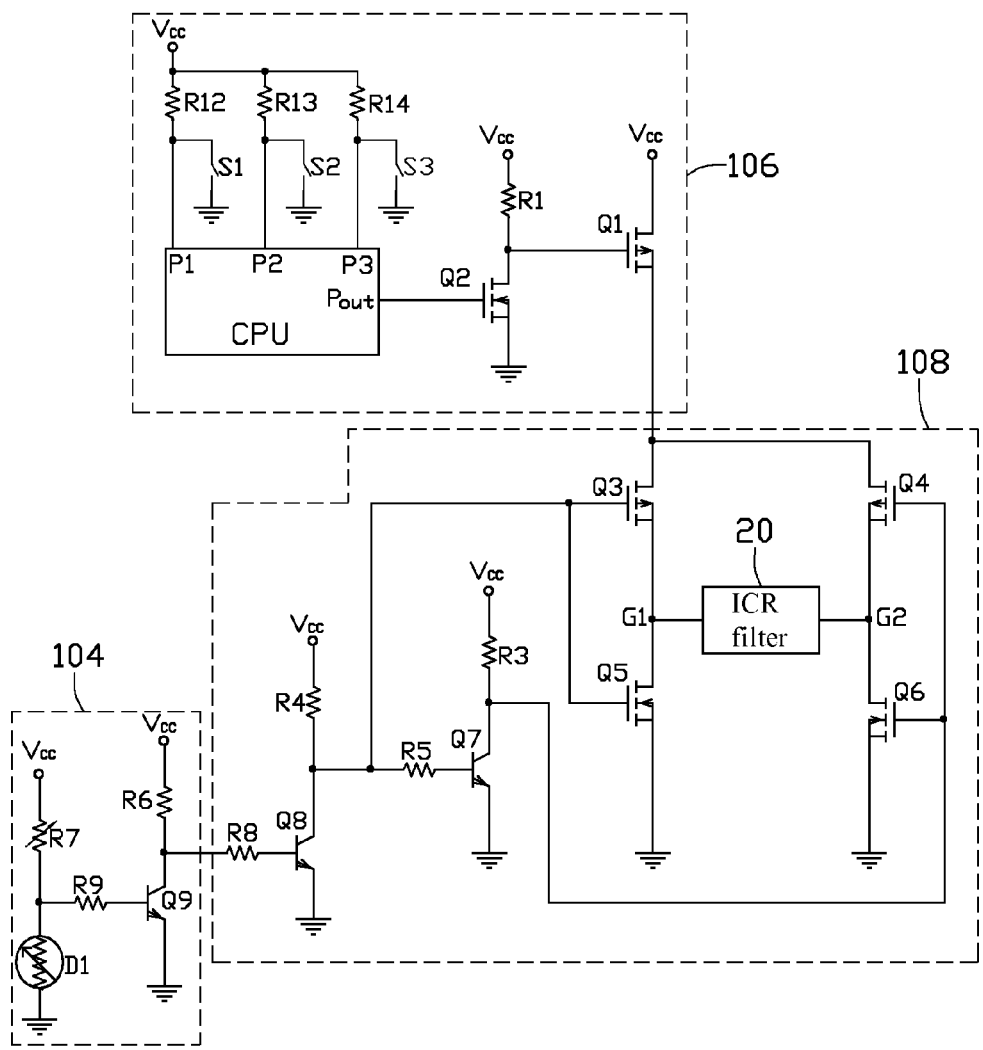
FIG. 3 is a circuit diagram showing an identifying module, a supply mode module, a switching module of the power supply circuit of FIG. 1.

Also referring to the FIG. 3, the identifying module 104 is configured for generating a first identifying signal when the brightness of external light is higher than a preset brightness, otherwise, generates a second identifying signal. In one embodiment, the identifying module 104 includes a photo-resistor D1, three resistors R6, R7, and R9, and a NPN-type transistor Q9. The resistor value of the resistor R7 is adjustable. The photo-resistor D1 and the resistor R7 is connected in series between the operating voltage $V_{CC}$ and the ground. The base of the transistor Q9 is connected to a node between the photo-resistor D1 and the resistor R7 by the resistor R9. The emitter of the transistor Q9 is connected to the ground. The collector of the transistor Q9 is connected to the operating voltage $V_{CC}$ by the resistor R6. The voltage of the collector of the transistor Q9 outputs the first and the second identifying signals.

When the brightness of external light gets lower, the resistor value of the photo-resistor D1 gets higher and vice versa. Therefore, by adjusting the resistor R7, the voltage loading on the base of the transistor Q9 can get to a threshold of the transistor Q9 when the brightness of external light becomes substantially equating to the preset brightness. The preset brightness can be set with reference to the brightness when the day is dusk or when the dawn approaches, like 6 o'clock in the evening or 6 o'clock in the morning. Therefore, when the brightness of external light is lower than the preset brightness, the transistor Q9 is on. The collector of the transistor Q9 generates the first identifying signal, which is a low level. When the brightness of external light is higher than the preset brightness, the transistor Q9 is off. The collector of the transistor Q9 generates the second identifying signal, which is a high level.

The supply mode module 106 is configured for generating a power supply corresponding to the power supply mode of the ICR filter 20. In specification, the supply mode module 106 includes a CPU, a P-channel type MOS transistor Q1, an N-channel type MOS transistor Q2, four resistors R1, R12, R13, and R14, and three switches S1, S2, and S3. The CPU includes a supply port $P_{out}$ and three mode ports P1 to P3. The supply port $P_{out}$ outputs continuous voltage, pulse voltage, or instantaneous voltage according to different levels of the mode ports P1 to P3 (see below). The mode ports P1, P2 and P3 are connected to the operating voltage $V_{CC}$ by the resistors R12, R13 and R14 respectively and are also connected to the ground by the switches S1, S2, and S3 respectively. The gate of the transistor Q2 is connected to the supply port $P_{out}$ of the CPU. The source of the transistor Q2 is connected to the ground. The drain of the transistor Q2 is connected to the operating voltage $V_{CC}$ by the resistor R1. The gate of the transistor Q1 is connected to the drain of the transistor Q2. The drain of the transistor Q1 is connected to the operating voltage $V_{CC}$. The voltage of the source of the transistor Q1 is the power supply of the supply mode module 106.

When the power supply mode of the ICR filter 20 is continuous power supply, the switch S1 is switched on and the switcher S2 and S3 are switched off. In this case, the CPU outputs a continuous high level voltage. Then, the transistors Q2 and Q1 are both on. The output of the transistor Q1 substantially equals to the operating voltage $V_{CC}$, which is a continuous high level.

When the power supply mode of the ICR filter 20 is a pulse power supply, the switch S2 is switched on and the switcher S1 and S3 are switched off. In this case, the CPU outputs a pulse voltage. The transistors Q2 and Q1 change their states between on and off constantly according to the pulse voltage. Therefore, the output of the transistor Q1 is a pulse voltage.

When the power supply mode of the ICR filter 20 is instantaneous power supply, the switch S3 is switched on and the switcher S1 and S2 are switched off. In this case, the CPU outputs an instantaneous voltage. Thus, the output of the transistor Q1 is also an instantaneous voltage.

The switching module 108 includes a first connecting node G1 and a second connecting node G2 for connecting to the ICR filter 20 and is configured for loading the power supply generated by the supply mode module 106 on one of the connecting nodes G1 and G2 according to the first and second identifying signals. In detail, the switching module 108 includes four resistors R3, R4, R5, and R8, two NPN-type transistors Q7 and Q8, two N-channel type MOS transistor Q4 and Q5, and two P-channel type MOS transistor Q3 and Q6. The base of the transistor Q8 is connected to the collector of the transistor Q9 by the resistor R8. The emitter of the transistor Q8 is connected to the ground. The collector of the transistor Q8 is connected to the operating voltage $V_{CC}$ by the resistor R4. The base of the transistor Q7 is connected to the collector of the transistor Q8 by the resistor R5. The emitter of the transistor Q7 is connected to the ground. The collector of the transistor Q7 is connected to the operating voltage $V_{CC}$ by the resistor R3. The gates of the transistors Q3 and Q5 are both connected to the collector of the transistor Q8. The source of the transistor Q5 is connected to the ground. The drain of the transistor Q5 is connected to the source of the transistor Q3. The drain of the transistor Q3 is connected to the source of the transistor Q1. The gates of the transistors Q4 and Q6 are both connected to the collector of the transistor Q7. The source of the transistor Q6 is connected to the ground. The drain of the transistor Q6 is connected to the source of the transistor Q4. The drain of the transistor Q4 is connected to the source of the transistor Q1. The first connecting node G1 is positioned between the source of the transistor Q3 and the drain of the transistor Q5. The second connecting node G2 is positioned between the source of the transistor Q4 and the drain of the transistor Q6.

When the brightness of external light is lower than the preset brightness, the identifying module 104 generates the first identifying signal, which is a low level. Thereby, the transistor Q8 is off. The collector of the transistor Q8 is a high level. Thus, the transistor Q7 is on. The collector of the transistor Q7 is a low level. In this case, the transistors Q3 and Q6 are off. The transistors Q4 and Q5 are on. The power supply generated by the supply mode module 106 loads on the second connecting nodes G2 and run through the ICR filter 20. Therefore, the ICR filter 20 drives two filters (e.g. an infrared filter and an optical interference filter) thereof to rotate clockwise/counterclockwise, so that one of the two filters is switched in front of a CCD of a surveillance camera.

When the brightness of external light is higher than the preset brightness, the identifying module 104 generates the second identifying signal, which is a high level. Thereby, the transistor Q8 is on. The collector of the transistor Q8 is a low level. Thus, the transistor Q7 is off. The collector of the transistor Q7 is a high level. In this case, the transistors Q3 and Q6 are on. The transistors Q4 and Q5 are off. The power supply generated by the supply mode module 106 loads on the first connecting nodes G1 and run through the ICR filter 20. Therefore, the ICR filter 20 drives the two filters to rotate counterclockwise/clockwise, so that another one of the two filter is switched in front of a CCD of a surveillance camera.

As the source of the transistor Q2 is connected to the ground, a high level output from the supply port $P_{out}$ can easily turn on the transistor Q2. Then the transistor Q3 is also turned on. Thereby, the output of the supply mode module 106 is substantially equals to the operating voltage $V_{CC}$, which may be much higher than the output of the supply port $P_{out}$ and is high enough to turn on the transistor Q3 or Q4. Thus, in other embodiments, when the output of the supply port $P_{out}$ is high enough to turn on the transistor Q3 or Q4, the resistor R1 and the transistors Q3 or Q4 may be omitted.

In alternative embodiments, the photo-resistor D1 can be replaced with other photoelectric sensor that can transform light signal into electric signal, such as photodiode or solar cell and so on. When a preset brightness has been defined, the resistor value of the resistor R7 keeps constant. Therefore, the value of the resistor R7 may be fixed.

In practical use, once the ICR filter 20 is connected into the power supply circuit 10 (e.g. by SMT), the power supply mode thereof keeps the same. In this case, the CPU can just output a corresponding mode of power supply, and the power supply mode of the CPU can be defined before connecting the CPU to the power supply circuit 10. Therefore, in alternative embodiments, the three resistors R12, R13, and R14 and the three switches S1, S2, and S3 may be omitted. In this situation, when an ICR filter 20 of different power supply mode replaces the former ICR filter 20, to maintain the operation of the ICR filter 20, users just have to replace the former CPU with a CPU outputting a corresponding power supply mode, rather than replacing the whole power supply circuit 10.

It will be understood that the above particular embodiments is shown and described by way of illustration only. The principles and the features of the present disclosure may be employed in various and numerous embodiment thereof without departing from the scope of the disclosure as claimed. The above-described embodiments illustrate the scope of the disclosure but do not restrict the scope of the disclosure.

What is claimed is:

1. A power supply circuit for an infrared cut removable (ICR) filter, comprising:

an identifying module configured for generating a first identifying signal when the brightness of external light is higher than a preset brightness and generating a second identifying signal when the brightness of the external light is lower than the preset brightness;

a supply mode module configured for generating a power supply corresponding to the power supply mode of the ICR filter, the supply mode module comprising a CPU, and the CPU comprising a supply port that is configured to output the power supply selected from one of a continuous voltage, a pulse voltage, and an instantaneous voltage;

a switching module electrically connected to the identifying module and the supply mode module, the switching module comprising a first and a second connecting nodes for connecting to the ICR filter and configured for loading the power supply generated by the supply mode module on one of the first and second nodes according to the first and second identifying signals; and a power source module configured for generating an operating voltage for the identifying module, the supply mode module, and the switching module.

2. The power supply circuit of claim 1, wherein the power source module comprises a converting module, two resistors, a first capacitor, and a second capacitor, the converting module comprising an input port for being connected to an external DC power supply, an output port, and a feed-back port, the two resistors are connected in series between the output port and the ground, the feed-back port is connected to a node between the two resistors, the first capacitor is connected between the input port of the converting module and the ground, the second capacitor is connected between the output port of the converting module and the ground.

3. The power supply circuit of claim 2, wherein the converting module is a low dropout regulator.

4. The power supply circuit of claim 1, wherein the identifying module comprises a photoelectric sensor, a first transistor, a first resistor, a second resistor, and a third resistor, the photoelectric sensor and the first resistor is connected in series between the operating voltage and the ground, the base of the first transistor is connected to a node between the photoelectric sensor and the first resistor by the second resistor, the emitter of the first transistor is connected to the ground, the collector of the first transistor is connected to the operating voltage by the third resistor, the collector of the first transistor outputs the first and the second identifying signals to the switching module.

5. The power supply circuit of claim 4, wherein the first transistor is an NPN-type transistor, the first resistor is an adjustable resistor, and the photoelectric sensor is selected from the group consisting of a photo-resistor, a photodiode and a solar cell.

6. The power supply circuit of claim 1, wherein the switching module comprises a fourth resistor, a fifth resistor, a sixth resistor, a seventh resistor, a second transistor of NPN-type, a third transistor of NPN-type, a first MOS transistor of N-channel type, a second MOS transistor of N-channel type, a third MOS transistor of P-channel type, and a fourth MOS transistor of P-channel type; the base of the second transistor is connected to the output of the identifying module by the fourth resistor, the emitter of the second transistor is connected to the ground, the collector of the second transistor is connected to the operating voltage by the fifth resistor; the base of the third transistor is connected to the collector of the second transistor by the sixth resistor, the emitter of the third transistor is connected to the ground, the collector of the third transistor is connected to the operating voltage by the seventh resistor; the gates of the third MOS transistor and the second MOS transistor are both connected to the collector of the third transistor, the source of the second MOS transistor is connected to the ground, the drain of the second MOS transistor is connected to the source of the third MOS transistor; the drain of the third MOS transistor is connected to an output of the supply mode module; the gates of the first MOS transistor and the fourth MOS transistor are both connected to the collector of the second transistor, the source of the fourth MOS transistor is connected to the ground, the drain of the fourth MOS transistor is connected to the source of the first MOS transistor; the drain of the first MOS transistor is connected to the output of the supply mode module; the first connecting node is positioned between the source of the first MOS transistor and the drain of the fourth MOS transistor, the second connecting node is positioned between the source of the third MOS transistor and the drain of the second MOS transistor.

7. The power supply circuit of claim 1, wherein the supply mode module further comprises three resistors and three switches, the CPU further comprises three mode ports; the three resistors are respectively connected between the three mode ports and the operating voltage, the three switches are respectively connected between the three mode ports and the ground; when one of the switches turns on while the other two switcher turns off, the CPU outputs a corresponding voltage.

8. The power supply circuit of claim 1, wherein the supply mode module further comprises an eighth resistor, a fifth MOS transistor of N-channel type, a sixth MOS transistor of P-channel type; the gate of the fifth MOS transistor is connected to the supply port of the CPU, the source of the fifth MOS transistor is connected to the ground, the drain of the fifth MOS transistor is connected to the operating voltage by the eighth resistor; the gate of the sixth MOS transistor is connected to the drain of the fifth MOS transistor, the drain of the sixth MOS transistor is connected to the operating voltage, the source of the sixth MOS transistor outputs the power supply.

9. A power supply circuit for an infrared cut removable (ICR) filter, comprising:
    an identifying module generating a first identifying signal when the brightness of external light is higher than a preset brightness and generating a second identifying signal when the brightness of the external light is lower than the preset brightness;
    a supply mode module generating different voltages corresponding to different power supply modes of the ICR filter, and selectively outputting a corresponding voltage based on an activated power supply mode of the ICR filter;
    a switching module electrically connected to the identifying module and the supply mode module, the switching module comprising a first and a second connecting nodes connected to the ICR filter and configured to load the corresponding voltage outputted from the supply mode module on one of the first and second nodes according to the first and second identifying signals, respectively; and
    a power source module generating an operating voltage for the identifying module, the supply mode module, and the switching module.

10. The power supply circuit of claim 9, wherein the supply mode module comprises a CPU, the CPU comprises a supply port that is configured for outputting the corresponding voltage selected from one of a continuous voltage, a pulse voltage, and an instantaneous voltage.

11. The power supply circuit of claim 10, wherein the supply mode module further comprises three resistors and three switches, the CPU further comprises three mode ports; the three resistors are respectively connected between the three mode ports and the operating voltage, the three switches are respectively connected between the three mode ports and the ground; when one of the switches turns on while the other two switcher turns off, the CPU outputs the corresponding voltage.

12. The power supply circuit of claim 10, wherein the supply mode module further comprises an eighth resistor, a fifth MOS transistor of N-channel type, a sixth MOS transistor of P-channel type; the gate of the fifth MOS transistor is connected to the supply port of the CPU, the source of the fifth MOS transistor is connected to the ground, the drain of the fifth MOS transistor is connected to the operating voltage by the eighth resistor; the gate of the sixth MOS transistor is connected to the drain of the fifth MOS transistor, the drain of the sixth MOS transistor is connected to the operating voltage, the source of the sixth MOS transistor outputs the corresponding voltage.

13. The power supply circuit of claim 9, wherein the power source module comprises a converting module, two resistors, a first capacitor, and a second capacitor, the converting module comprising an input port connected to an external DC power supply, an output port, and a feed-back port, the two resistors are connected in series between the output port and the ground, the feed-back port is connected to a node between the two resistors, the first capacitor is connected between the input port of the converting module and the ground, the second capacitor is connected between the output port of the converting module and the ground.

14. The power supply circuit of claim 13, wherein the converting module is a low dropout regulator.

15. The power supply circuit of claim 9, wherein the identifying module comprises a photoelectric sensor, a first transistor, a first resistor, a second resistor, and a third resistor, the photoelectric sensor and the first resistor is connected in series between the operating voltage and the ground, the base of the first transistor is connected to a node between the photoelectric sensor and the first resistor by the second resistor, the emitter of the first transistor is connected to the ground, the collector of the first transistor is connected to the operating voltage by the third resistor, the collector of the first transistor outputs the first and the second identifying signals to the switching module.

16. The power supply circuit of claim 15, wherein the first transistor is an NPN-type transistor, the first resistor is an adjustable resistor, and the photoelectric sensor is selected from the group consisting of a photo-resistor, a photodiode, and a solar cell.

17. The power supply circuit of claim 9, wherein the switching module comprises a fourth resistor, a fifth resistor, a sixth resistor, a seventh resistor, a second transistor of NPN-type, a third transistor of NPN-type, a first MOS transistor of N-channel type, a second MOS transistor of N-channel type, a third MOS transistor of P-channel type, and a fourth MOS transistor of P-channel type; the base of the second transistor is connected to the output of the identifying module by the fourth resistor, the emitter of the second transistor is connected to the ground, the collector of the second transistor is connected to the operating voltage by the fifth resistor; the base of the third transistor is connected to the collector of the second transistor by the sixth resistor, the emitter of the third transistor is connected to the ground, the collector of the third transistor is connected to the operating voltage by the seventh resistor; the gates of the third MOS transistor and the second MOS transistor are both connected to the collector of the third transistor, the source of the second MOS transistor is connected to the ground, the drain of the second MOS transistor is connected to the source of the third MOS transistor; the drain of the third MOS transistor is connected to an output of the supply mode module; the gates of the first MOS transistor and the fourth MOS transistor are both connected to the collector of the second transistor, the source of the fourth MOS transistor is connected to the ground, the drain of the fourth MOS transistor is connected to the source of the first MOS transistor; the drain of the first MOS transistor is connected to the output of the supply mode module; the first connecting node is positioned between the source of the first MOS transistor and the drain of the fourth MOS transistor, the second connecting node is positioned between the source of the third MOS transistor and the drain of the second MOS transistor.

* * * * *